(12) United States Patent
Margatan

(10) Patent No.: US 10,165,038 B2
(45) Date of Patent: Dec. 25, 2018

(54) REQUEST ROUTING FOR A MODULARIZED FRONT-END

(71) Applicant: Microsoft Technology Licensing, LLC, Redmond, WA (US)

(72) Inventor: James Margatan, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 157 days.

(21) Appl. No.: 15/086,533

(22) Filed: Mar. 31, 2016

(65) Prior Publication Data

US 2017/0289233 A1 Oct. 5, 2017

(51) Int. Cl.
*H04L 29/06* (2006.01)
*H04L 29/08* (2006.01)

(52) U.S. Cl.
CPC ............. *H04L 67/02* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 5,737,560 A | * | 4/1998 | Yohanan | G06F 17/30876 715/847 |
| 6,185,625 B1 | * | 2/2001 | Tso | G06F 17/30905 707/E17.121 |
| 6,247,050 B1 | * | 6/2001 | Tso | H04L 29/06 709/203 |
| 2005/0132286 A1 | | 6/2005 | Rohrabaugh et al. | |
| 2011/0125765 A1 | | 5/2011 | Tuli | |
| 2017/0310735 A1 | * | 10/2017 | Mickens | H04L 67/025 |
| 2018/0013743 A1 | * | 1/2018 | Shyamsunder | H04L 67/10 |

OTHER PUBLICATIONS

"Content negotiation", [Online] Retrieved from the Internet :<URL:https://en.wikipedia.org/w/index.phptitle=Content_negotiation&oldid=707262175>, (Feb. 27, 2016), 3 pgs.
"International Application Serial No. PCT/US2016/025244, International Search Report dated Aug. 9, 2016", 5 pgs.

(Continued)

*Primary Examiner* — Brian Whipple
(74) *Attorney, Agent, or Firm* — Schwegman Lundberg & Woessner, P.A.

(57) ABSTRACT

This disclosure provides for a client-server paradigm where a server identifies a layout for a requested webpage from one or more header parameter values obtained from the initial request for the webpage from a client. The server obtains local and remote measures from the one or more header parameter values. The server then evaluates the local and remote measures, where the local measures are evaluated locally and the remote measures require further communications with other systems, databases, and/or architectures to be evaluated. Once the local measures are evaluated, the server engages in predictive communications by requesting those layouts which satisfy the evaluated local measures. When the remote measures have been evaluated, the server then selects the layout configuration that satisfies both the local and remote measures. This selected layout, along with the resources associated with the requested webpage, are then communicated to the client.

20 Claims, 6 Drawing Sheets

(56) References Cited

OTHER PUBLICATIONS

"International Application Serial No. PCT/US2016/025244, Written Opinion dated Aug. 9, 2016", 7 pgs.

"List of HTTP header fields", [Online] Retrieved from the Internet : <https ://en.wiki pedi a.org/w/i ndex.php?t itle=List of HTTP header fields&oldid=7094 83441>, (Mar. 11, 2016), 7 pgs.

"Parallel computing", [Online] Retrieved from the Internet : <https://en.wikipedia.org/w/index.phptitle=Parallel_computing&oldid=712703936>, (Mar. 30, 2016), 20 pgs.

"User agent (http)", [Online] Retrieved from the Internet : <URL: https ://en.wiki pedi a.org/w/i ndex.phptitle=User_agent&oldid=712631485>, (Mar. 30, 2016), 5 pgs.

\* cited by examiner

REQUEST ROUTING FOR A MODULARIZED FRONT-END

TECHNICAL FIELD

The subject matter disclosed herein generally relates to request routing for a modularized front-end.

BACKGROUND

An online social networking service provides a platform whereby a member of the social networking service may connect with other members of the social networking service. The social networking service provides a number of services to the member, such as job seeking services, job hosting services, member profile services, job history services, resume building services, and other such services. From interacting with these services, the social networking service stores information provided by members in a corresponding member profile.

To access the social networking service, a member typically uses a web browser or other programmatic client. When the web browser connects with the social networking service, the web browser sends one or more requests to the social networking service using an Internet-capable protocol, such as the Hypertext Markup Language Protocol (HTTP), for a webpage to begin the member's session with the social networking service. The webpage may be written using one or more computer-programming and/or computer-scripting languages, such as JavaScript, Cascading Style Sheets (CSS), the Hypertext Markup Language (HTML), and other languages.

Furthermore, the webpage may include robust and/or dynamic content to enhance the member's experience with the social networking service. However, to fully render the webpage, the web browser typically sends multiple requests to the social networking service's Web server. This results in significant delays in the web browser rendering the webpage and providing the webpage in its fully functional form. Finally, as a webpage may include third-party content or modules, the web browser spends a non-trivial amount of time in communicating with the third-party content or modules to complete their instantiation or execution on the requested webpage.

BRIEF DESCRIPTION OF THE DRAWINGS

Some embodiments are illustrated by way of example and not limitation in the figures of the accompanying drawings.

DETAILED DESCRIPTION

Figure 1:
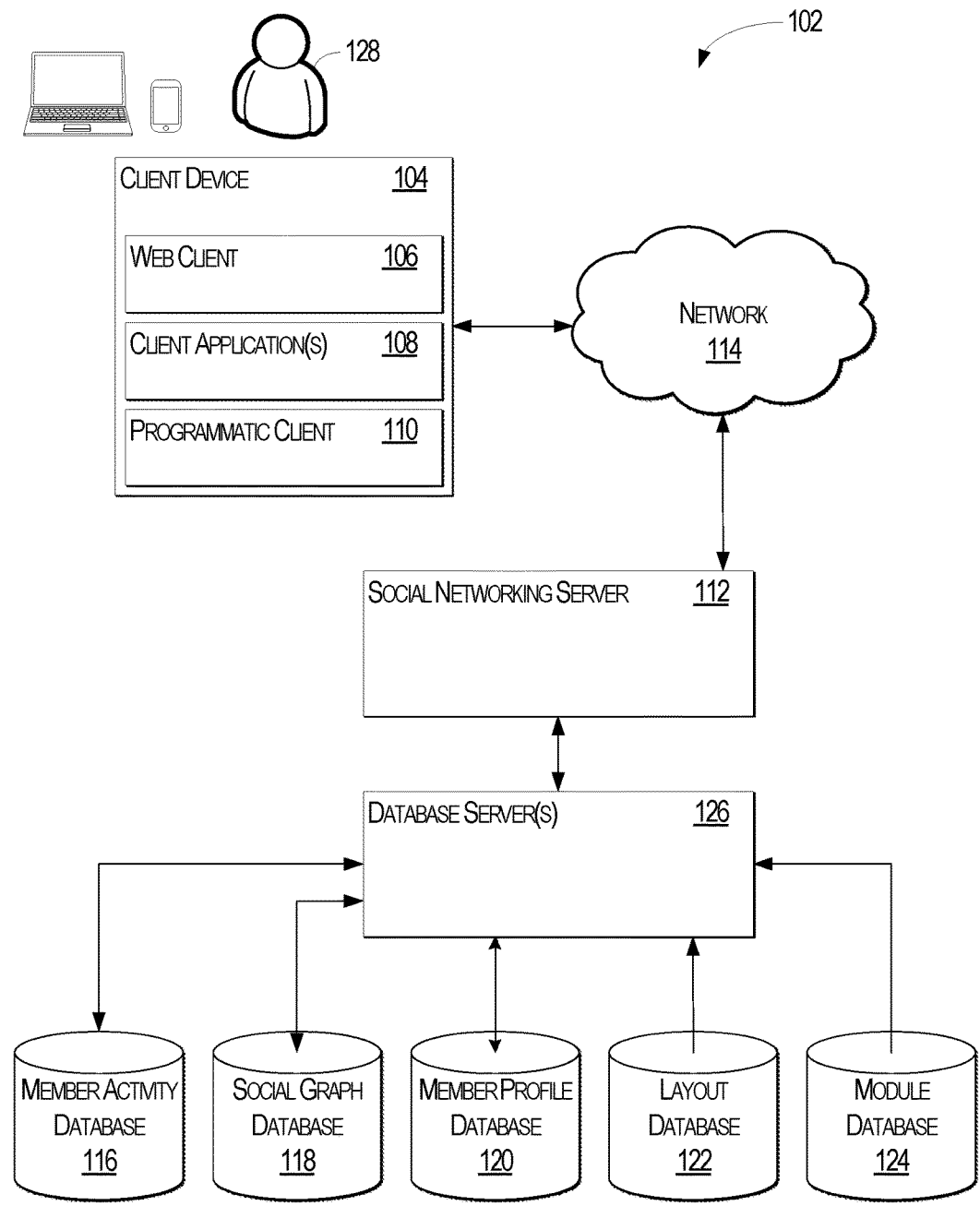
FIG. 1 is a block diagram illustrating a networked system, according to some example embodiments, including a social networking server.

Example methods and systems are directed to request routing for a modularized front-end and, in particular, to evaluating one or more header parameters received in an HTTP request and selecting a layout configuration file that corresponds to the identified header parameters.

In one embodiment, this disclosure provides for a system that includes a machine-readable medium storing computer-executable instructions and at least one hardware processor communicatively coupled to the machine-readable medium that, when the computer-executable instructions are executed, configures the system to extract one or more parameter values from a request for a webpage, identify the extracted one or more parameter values as one or more local measures and one or more remote measures, and evaluate the one or more local measures to obtain a first set of one or more corresponding layout property values, at least one of the first set of one or more layout property values specifying a characteristic of a layout for the requested webpage.

In addition, the system is further configured to request one or more layout configurations according to the first set of one or more layout property values while the one or more layout configurations are being requested, evaluate one or more remote measures to obtain a second set of one or more corresponding layout property values, identify a layout configuration selected from the one or more requested layout configurations according to the second set of one or more corresponding layout property values, and communicate the identified layout configuration to a client device for displaying the requested webpage according to the identified layout configuration.

In another embodiment of the system, the system is further configured to retrieve a plurality of modules for displaying the requested webpage, at least one of the modules being displayable within a portion of the requested webpage defined by the identified layout configuration, and communicate the retrieved plurality of modules to the client device.

In a further embodiment of the system, the identified layout configuration and the retrieved plurality of modules are communicated asynchronously to the client device.

In yet another embodiment of the system, a local measure comprises a parameter value that is locally evaluated by the at least one hardware processor without communicating the local measure using a network communication protocol.

In yet a further embodiment of the system, a remote measure comprises a parameter value that is communicated to a non-local system using a network communication protocol for evaluation.

In another embodiment of the system, the one or more parameter values are obtained from one or more Hypertext Transfer Protocol header fields of the request for the webpage.

In a further embodiment of the system, the requested one or more layout configurations are each associated with a third set of layout property values, each set of layout property values for each of the sets of the third set of layout property values being unique.

This disclosure also explains a method that includes extracting, by at least one hardware processor, one or more parameter values from a request for a webpage, identifying, by at least one hardware processor, the extracted one or more parameter values as one or more local measures and one or more remote measures, and evaluating, by at least one hardware processor, the one or more local measures to obtain a first set of one or more corresponding layout property values, at least one of the first set of one or more layout property values specifying a characteristic of a layout for the requested webpage.

The method also includes requesting, by at least one hardware processor, one or more layout configurations according to the first set of one or more layout property values, and while the one or more layout configurations are being requested, evaluating, by at least one hardware processor, one or more remote measures to obtain a second set of one or more corresponding layout property values. The method further includes identifying, by at least one hardware processor, a layout configuration selected from the one or more requested layout configurations according to the second set of one or more corresponding layout property values and communicating, by at least one hardware processor, the identified layout configuration to a client device for displaying the requested webpage according to the identified layout configuration.

In another embodiment of the method, the method includes retrieving a plurality of modules for displaying the requested webpage, at least one of the modules being displayable within a portion of the requested webpage defined by the identified layout configuration, and communicating the retrieved plurality of modules to the client device.

In a further embodiment of the method, the identified layout configuration and the retrieved plurality of modules are communicated asynchronously to the client device.

In yet another embodiment of the method, a local measure comprises a parameter value that is locally evaluated without communicating the local measure using a network communication protocol.

In yet a further embodiment of the method, a remote measure comprises a parameter value that is communicated to a non-local system using a network communication protocol for evaluation.

In another embodiment of the method, the one or more parameter values are obtained from one or more Hypertext Transfer Protocol header fields of the request for the webpage.

In a further embodiment of the method, the requested one or more layout configurations are each associated with a third set of layout property values, each set of layout property values for each of the sets of the third set of layout property values being unique.

This disclosure also provides for a machine-readable medium storing computer-executable instructions that, when executed by at least one hardware processor communicatively coupled to the machine-readable medium, configures a system to perform a plurality of operations that include extracting one or more parameter values from a request for a webpage and identifying the extracted one or more parameter values as one or more local measures and one or more remote measures. The plurality of operations also include evaluating the one or more local measures to obtain a first set of one or more corresponding layout property values, at least one of the first set of one or more layout property values specifying a characteristic of a layout for the requested webpage, and requesting one or more layout configurations according to the first set of one or more layout property values.

In addition, while the one or more layout configurations are being requested, the plurality of operations include evaluating one or more remote measures to obtain a second set of one or more corresponding layout property values, identifying a layout configuration selected from the one or more requested layout configurations according to the second set of one or more corresponding layout property values, and communicating the identified layout configuration to a client device for displaying the requested webpage according to the identified layout configuration.

In another embodiment of the machine-readable medium, the plurality of operations further include retrieving a plurality of modules for displaying the requested webpage, at least one of the modules being displayable within a portion of the requested webpage defined by the identified layout configuration, and communicating the retrieved plurality of modules to the client device.

In a further embodiment of the machine-readable medium of claim, the identified layout configuration and the retrieved plurality of modules are communicated asynchronously to the client device.

In yet another embodiment of the machine-readable medium, a local measure comprises a parameter value that is locally evaluated by the at least one hardware processor without communicating the local measure using a network communication protocol.

In yet a further embodiment of the machine-readable medium, a remote measure comprises a parameter value that is communicated to a non-local system using a network communication protocol for evaluation.

In another embodiment of the machine-readable medium, the requested one or more layout configurations are each associated with a third set of layout property values, each set of layout property values for each of the sets of the third set of layout property values being unique.

Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

With reference to FIG. 1, an example embodiment of a high-level client-server-based network architecture 102 is shown. A social networking server 112 provides server-side functionality via a network 114 (e.g., the Internet or wide area network (WAN)) to one or more client devices 104. FIG. 1 illustrates, for example, a web client 106 (e.g., a browser, such as the Internet Explorer® browser developed by Microsoft® Corporation of Redmond, Wash. State), client application(s) 108, and a programmatic client 110 executing on client device 104. The social networking server 112 is further communicatively coupled with one or more database servers 124 that provide access to one or more databases 116-124.

The client device 104 may comprise, but is not limited to, a mobile phone, desktop computer, laptop, portable digital assistants (PDAs), smart phone, tablet, ultra book, netbook, laptop, multi-processor system, microprocessor-based or programmable consumer electronic, or any other communication device that a user 128 may utilize to access the social networking server 112. In some embodiments, the client device 104 may comprise a display module (not shown) to display information (e.g., in the form of user interfaces). In further embodiments, the client device 104 may comprise one or more of touch screens, accelerometers, gyroscopes, cameras, microphones, global positioning system (GPS) devices, and so forth. The client device 104 may be a device of a user 128 that is used to perform one or more searches for user profiles accessible to, or maintained by, the social networking server 112.

In one embodiment, the social networking server 112 is a network-based appliance that responds to initialization requests or search queries from the client device 104. One or more users 128 may be a person, a machine, or other means of interacting with the client device 104. In various embodiments, the user 128 is not part of the network architecture 102, but may interact with the network architecture 102 via the client device 104 or another means. For example, one or more portions of the network 114 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 104 may include one or more applications (also referred to as "apps") such as, but not limited to, a web browser, messaging application, electronic mail (email) application, a social networking access client, and the like. In some embodiments, if the social networking access client is included in the client device 104, then this application is configured to locally provide the user interface and at least some of the functionalities with the application configured to communicate with the social networking server 112, on an as needed basis, for data and/or processing capabilities not locally available (e.g., access to a member profile, to authenticate a user 128, to identify or locate other connected members, etc.). Conversely if the social networking access client is not included in the client device 104, the client device 104 may use its web browser to access the initialization and/or search functionalities of the social networking server 112.

One or more users 128 may be a person, a machine, or other means of interacting with the client device 104. In example embodiments, the user 128 is not part of the network architecture 102, but may interact with the network architecture 102 via the client device 104 or other means. For instance, the user 128 provides input (e.g., touch screen input or alphanumeric input) to the client device 104 and the input is communicated to the client-server-based network architecture 102 via the network 114. In this instance, the social networking server 112, in response to receiving the input from the user 128, communicates information to the client device 104 via the network 114 to be presented to the user 128. In this way, the user 128 can interact with the social networking server 112 using the client device 104.

Further, while the client-server-based network architecture 102 shown in FIG. 1 employs a client-server architecture, the present subject matter is of course not limited to such an architecture, and could equally well find application in a distributed, or peer-to-peer, architecture system, for example.

In addition to the client device 104, the social networking server 112 communicates with other one or more database server(s) 126 and/or database(s) 116-124. In one embodiment, the social networking server 112 is communicatively coupled to a member activity database 116, a social graph database 118, a member profile database 120, a layout database 122, and a module database 124. The databases 116-124 may be implemented as one or more types of databases including, but not limited to, a hierarchical database, a relational database, an object-oriented database, one or more flat files, or combinations thereof.

The member profile database 120 stores member profile information about members who have registered with the social networking server 112. With regard to the member profile database 120, the member may include an individual person or an organization, such as a company, a corporation, a nonprofit organization, an educational institution, or other such organizations.

Consistent with some embodiments, when a person initially registers to become a member of the social networking service provided by the social networking server 112, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the member profile database 120. Similarly, when a representative of an organization initially registers the organization with the social networking service provided by the social networking server 112, the representative may be prompted to provide certain information about the organization. This information may be stored, for example, in the member profile database 120. With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Members of the social networking service may establish connections with one or more members and/or organizations of the social networking service. The connections may be defined as a social graph, where the member and/or organization is represented by a vertex in the social graph and the edges identify connections between vertices. In this regard, the edges may be bilateral (e.g., two members and/or organizations have agreed to form a connection), unilateral (e.g., one member has agreed to form a connection with another member), or combinations thereof. In this manner, members are said to be first-degree connections where a single edge connects the vertices representing the members; otherwise, members are said to be "nth"-degree connections where "n" is defined as the number of edges separating two vertices. As an example, two members are said to be "2nd-degree" connections where each member shares a connection in common with the other member, but the members are not directly connected to one another. In one embodiment, the social graph maintained by the social networking server 112 is stored in the social graph database 118.

Although the foregoing discussion refers to "social graph" in the singular, one of ordinary skill in the art will recognize that the social graph database 118 may be configured to store multiple social graphs. For example, and without limitation, the social networking server 112 may maintain multiple social graphs, where each social graph corresponds to various geographic regions, industries, members, or combinations thereof.

As members interact with the social networking service provided by the social networking server 112, the social networking server 112 is configured to monitor these interactions. Examples of interactions include, but are not limited to, commenting on content posted by other members, viewing member profiles, editing or viewing a member's own profile, sharing content outside of the social networking service (e.g., an article provided by an entity other than the social networking server 112), updating a current status, posting content for other members to view and/or comment on, and other such interactions. In one embodiment, these interactions are stored in a member activity database 116, which associates interactions made by a member with his or her member profile stored in the member profile database 120.

The layout database 122 stores one or more layout configuration files for defining the layout of a corresponding webpage. In one embodiment, a layout configuration file defines the portions and/or sections of a webpage for the type and/or substance of content that is to appear in a defined portion and/or section of the webpage. In this manner, one or more webpages provided by the social networking server 112 may each be associated with a corresponding layout configuration file. Alternatively and/or additionally, a layout configuration file corresponds to more than one webpage.

In one embodiment, a layout configuration file is associated with one or more layout properties. In this regard, a layout property specifies a characteristic of the associated layout configuration file. Examples of layout properties include, but are not limited to, a layout function type that specifies the function of the layout, a layout browser type that indicates the web browser in which the layout should be displayed, and a layout member type that indicates the type of member for which the layout is intended. An example combination of layout property values include "homepage," "desktop," and "company administrator," which indicates that the associated layout is for the homepage of a member that is an administrator of a company, which is to be displayed on a desktop web browser. Another example combination of layout property values include "invitation," "mobile," and "standard member," when indicates that the associated layout is for sending invitations to other members for a standard member of the social networking service, which is to be displayed within a mobile web browser. In this manner, the various combinations of layout property values can be used to select one or more of the layout configuration files.

Furthermore, the layout database 122 includes one or more layout configuration templates, which an administrator or maintainer of a webpage or micro-site provided by the social networking server 112 (e.g., a company's webpage or collection of webpages) may use to construct one or more layout configuration files. In this regard, the layout configuration templates may be generic and define the type of content to instantiate or display within a given portion or section of a webpage, whereas a constructed layout configuration file may specifically identify the content to display or instantiate within the given portion or section corresponding to the content type identified by the layout configuration template. As discussed below, the selection of which layout configuration file to communicate to the client device 104 may be dependent upon the resolution of one or more local and/or remote measures communicated from the client device 104 to the social networking server 112. In various embodiments, the layout configuration file is written using one or more computer-programming and/or computer-scripting languages such as JavaScript Object Notation (JSON), YAML Ain't Markup Language (YAML), Extensible Markup Language (XML), and other such languages or combination of languages.

A module database 124 provides access to one or more modules which may be retrieved by the social networking server 112 and communicated to the client device 104. The modules stored within the module database 124 provide various functionalities and features for engaging with the social networking service provided by the social networking server 112. In one embodiment, the modules stored within the module database 124 are designed to provide a given feature or functionality. For example, the module database 124 may include a module that provides updates about a member's connections, a module that facilitates the uploading and/or editing of a member's profile selected from the member profile database 120, a module that retrieves news or other items of interest for a member's profile, a module that facilitates searching for content provided by the social networking server 112, and other such modules. In summary, the modules stored in the module database 124 may provide one or more functionalities that enhance a member's experience with the social networking service.

In one embodiment, the modules of the module database 124 are implemented under the Web Component framework, which defines a framework for implementing web-based applications that execute within a web browser and can operate independently. Modules that are developed under the Web Component framework are generally referred to as "web components." As of the time of this disclosure, the framework for Web Components is still being developed by the World Wide Web Consortium (W3C), but it is generally recognized as comprising five components: templates, decorators, custom elements, shadow DOM, and imports. One of the technical benefits of implementing the modules as web components is that a web component fully encapsulates all of its own HTML and CSS. With this type of encapsulation, a web browser (e.g., the web client 106) will render a web component as the developer intended. In addition, the web component operates independently and free from interference from externally executing JavaScript. Various programming libraries are available for implementing web components and include, but are not limited to, Polymer, X-Tag, Bosonic, and other such libraries or combination of libraries.

As discussed below, the social networking server 112 retrieves one or more modules from the module database 124 according to the layout configuration file associated with a requested webpage. Furthermore, as the requested webpage and/or layout configuration file may be implemented in JSON or other asynchronous computer-programming and/or computer-scripting language, the web browser 106 rendering the webpage also renders the retrieved modules without reloading the requested webpage. In this manner, the web browser 106 displays the substantive portions of the requested webpage as they are being loaded. This asynchronous feature significantly reduces the latency typically experienced with traditional methods of webpage development and deployment, which is a technical problem unique to this field.

In one embodiment, the social networking server 112 communicates with the various databases 116-124 through one or more database server(s) 126. In this regard, the database server(s) 126 provide one or more interfaces and/or services for providing content to, modifying content in, removing content from, or otherwise interacting with, the databases 116-124. For example, and without limitation, such interfaces and/or services may include one or more Application Programming Interfaces (APIs), one or more services provided via a Service-Oriented Architecture ("SOA"), one or more services provided via a REST-Oriented Architecture ("ROA"), or combinations thereof. In an alternative embodiment, the social networking server 112 communicates with the databases 116-124 and includes a database client, engine, and/or module, for providing data to, modifying data stored within, and/or retrieving data from, the one or more databases 116-124.

While the database server(s) 126 is illustrated as a single block, one of ordinary skill in the art will recognize that the database server(s) 126 may include one or more such servers. For example, the database server(s) 126 may include, but are not limited to, a Microsoft® Exchange Server, a Microsoft® Sharepoint® Server, a Lightweight Directory Access Protocol ("LDAP") server, a MySQL database server, or any other server configured to provide access to one or more of the databases 116-122, or combinations thereof. Accordingly, and in one embodiment, the database server(s) 126 implemented by the social networking service are further configured to communicate with the social networking server 112.

Figure 2:
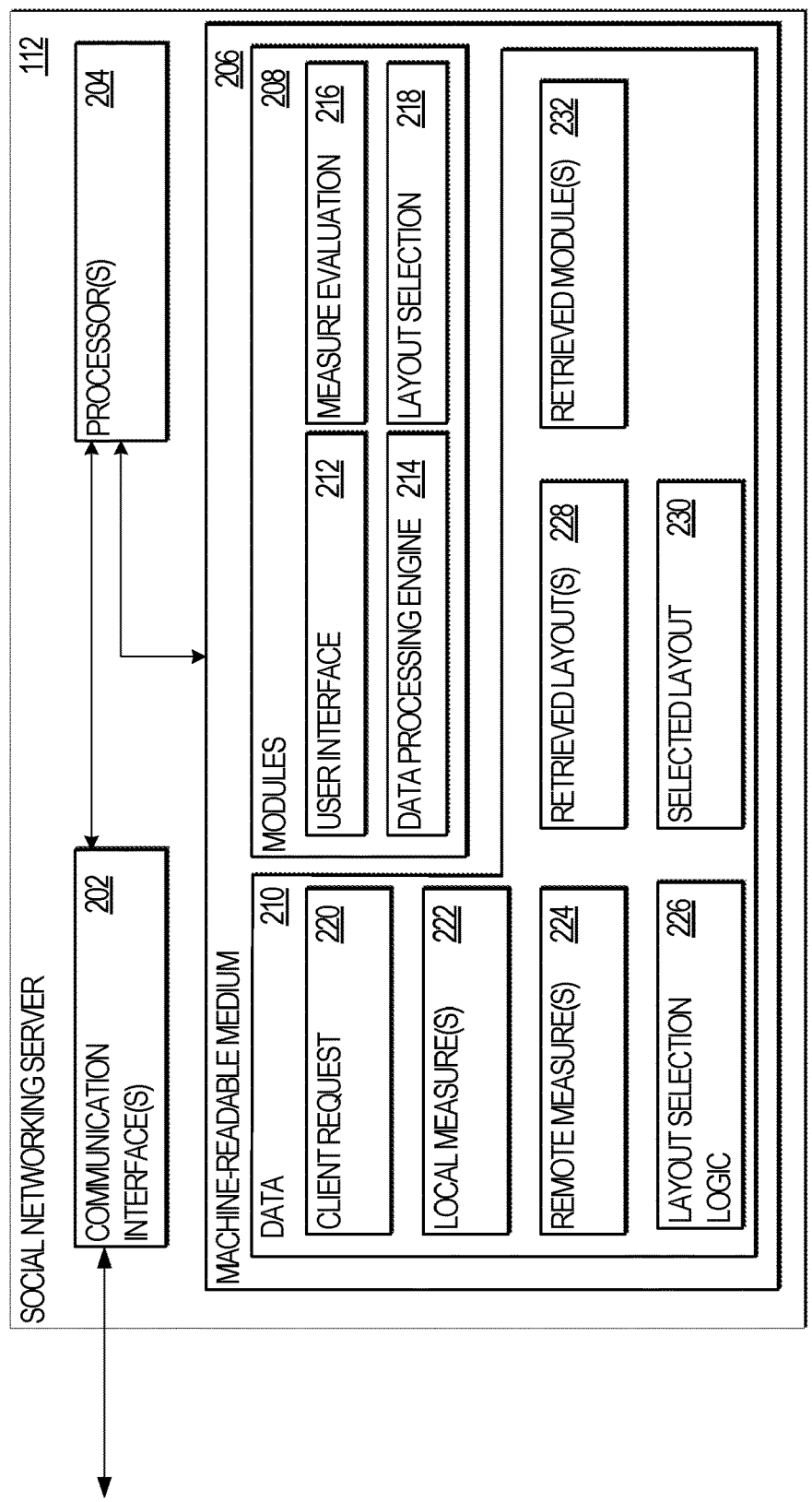
FIG. 2 illustrates the social networking server of FIG. 1, according to an example embodiment.

FIG. 2 illustrates the social networking server 112 of FIG. 1 in accordance with an example embodiment. In one embodiment, the social networking server 112 includes one or more processor(s) 204, one or more communication interface(s) 202, and a machine-readable medium 206 that stores computer-executable instructions for one or more modules 208 and data 210 used to support one or more functionalities of the modules 208.

The various functional components of the social networking server 112 may reside on a single device or may be distributed across several computers in various arrangements. The various components of the social networking server 112 may, furthermore, access one or more databases (e.g., databases 116-124 or any of data 210), and each of the various components of the social networking server 112 may be in communication with one another. Further, while the components of FIG. 2 are discussed in the singular sense, it will be appreciated that in other embodiments multiple instances of the components may be employed.

The one or more processors 204 may be any type of commercially available processor, such as processors available from the Intel Corporation, Advanced Micro Devices, Texas Instruments, or other such processors. Further still, the one or more processors 204 may include one or more special-purpose processors, such as a Field-Programmable Gate Array (FPGA) or an Application Specific Integrated Circuit (ASIC). The one or more processors 204 may also include programmable logic or circuitry that is temporarily configured by software to perform certain operations. Thus, once configured by such software, the one or more processors 204 become specific machines (or specific components of a machine) uniquely tailored to perform the configured functions and are no longer general-purpose processors.

The one or more communication interfaces 202 are configured to facilitate communications between the social networking server 112, the client device 104, and one or more of the database server(s) 126 and/or databases 116-124. The one or more communication interfaces 202 may include one or more wired interfaces (e.g., an Ethernet interface, Universal Serial Bus ("USB") interface, a Thunderbolt® interface, etc.), one or more wireless interfaces (e.g., an IEEE 802.11b/g/n interface, a Bluetooth® interface, an IEEE 802.16 interface, etc.), or combinations of such wired and wireless interfaces.

The machine-readable medium 206 includes various modules 208 and data 210 for implementing the social networking server 112. The machine-readable medium 206 includes one or more devices configured to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the modules 208 and the data 210. Accordingly, the machine-readable medium 206 may be implemented as a single storage apparatus or device, or, alternatively and/or additionally, as "cloud-based" storage systems or storage networks that include multiple storage apparatus or devices. As shown in FIG. 2, the machine-readable medium 206 excludes signals per se.

In one embodiment, the modules 208 are written in a computer-programming and/or scripting language. Examples of such languages include, but are not limited to, C, C++, C#, Java, JavaScript, Perl, Python, or any other computer programming and/or scripting language now known or later developed.

With reference to FIG. 2, the modules 208 of the social networking server 112 include, but are not limited to, a user interface module 212, a data processing engine 214, a measure evaluation module 214, and a layout selection module 218. The data 210 referenced and used by the modules 208 include the client request 220 for the requested webpage, one or more local measure(s) 224 extracted from the client request 220, one or more remote measure(s) 226 determined from the client request 220, layout selection logic 228 for selecting and/or determining a layout configuration file, one or more retrieved layout(s) 230 retrieved in response to the received client request 220, a selected layout 232 selected from the retrieved layout(s) 230, and one or more retrieved module(s) 234 retrieved according to the selected layout 232. The result from processing the data 210 includes the selected layout 232, which is communicated to the client device 104 for rendering and displaying the requested webpage.

The user interface module 212 is configured to provide access to, and interactions with, the social networking server 112. In one embodiment, the user interface module 212 provides one or more graphical user interfaces, which may be provided using the Hypertext Transfer Protocol (HTTP). The graphical user interfaces are displayable by the client device 104 and accept input from the user 128 for interacting with the social networking server 112. Further still, the user interface module 212 may be configured to provide such interfaces to one or more clients displayable by the client device 104, such as the web client 106, one or more client applications 108, or the programmatic client 110. By interacting with the user interface module 212, the user 128 can request various webpages provided by the social networking server 112. Further still, the user interface module 212 is configured to communicate the selected layout 232 and the one or more retrieved module(s) 234 for display by the client device 104.

The data processing engine 214 is configured to process the client request 220 received from the client device 104 and to extract various parameters therefrom. In one embodiment, the client request 220 is communicated using HTTP and includes various parameter values within the header of the HTTP request. An example of the header parameters contained within the HTTP request are listed below:

GET/nhome/HTTP/1.1
Host: www.linkedin.com
User-Agent: Mozilla/5.0 (Windows NT 6.3; WOW64; rv:44.0) Gecko/20100101 Firefox/44.0
Accept: text/html,application/xhtml+xml,application/xml; q=0.9,*/*; q=0.8
Accept-Language: en-US,en; q=0.5
Accept-Encoding: gzip, deflate, br
Referer: https://www.linkedin.com/
Cookie: memUID="abcde12345"
Connection: keep-alive
Cache-Control: max-age=0

In the foregoing example, the parameters of the HTTP request include a path parameter having the value of "/nhome/", a host parameter having the value of "www.linkedin.com", a user-agent parameter of "Mozilla/5.0 (Windows NT 6.3; WOW64; rv:44.0) Gecko/20100101 Firefox/44.0", and a member identifier parameter of "abcde12345." The path parameter identifies the resources that the social networking server 112 is to provide the client device 104 and displaying the requested webpage. The host parameter identifies the host Uniform Resource Location (URL) of the resources used to display the requested webpage. The user-agent parameter identifies the type of web browser (e.g., the type of web client 106) being used by the user 128. The member identifier parameter (e.g., the memUID parameter) identifies the member profile associated with a requested webpage. In one embodiment, the member identifier parameter identifies the user 128 using the client device 104.

One or more of the parameters extracted from the HTTP header may be stored as the local measure(s) 222 and/or the remote measure(s) 224. One of the technical benefits provided by this disclosure is that the social networking server 112 distinguishes between parameters that can be evaluated reasonably quickly (e.g., a local measure) and those parameters that may require further evaluation or an additional request to another system or architecture for evaluation (e.g., a remote measure). In other words, and in one embodiment, a local measure is a parameter that can be evaluated by the social networking server 112 whereas a remote measure is a parameter that the social networking server 112 evaluates by communicating with another architecture, system, or database. For example, the remote measure may be communicated using one or more network communication protocols (e.g., TCP/IP) whereas the local measure is evaluated locally without communicating the local measure using the one or more network communication protocols.

Distinguishing between local and remote measures is a technical benefit because it results in a more immediate response to the client request 220. As discussed below, while the social networking server 112 is waiting for a response to a requested evaluation of a remote measure, the social networking server 112 can be engaged in other tasks until the response is received. Thus, this feature reduces the amount of latency the user 128 may experience after he or she requests an identified webpage provided by the social networking server 112.

The measure evaluation module 216 is configured to evaluate one or more of the local measures 222 and process one or more the remote measures 224. Initially, the data processing engine 214 may parse out the received parameters into the local measure(s) 222 and the remote measure(s) 224. The measure evaluation module 216 then evaluates the local measures 222 and the remote measures 224 in parallel. Accordingly, in alternative embodiments, the evaluation of the local measures 222 and the remote measures 224 occur in serial (e.g., the local measures 222 are evaluated first and then the remote measures 224 are then evaluated or vice versa).

In one embodiment, evaluation of the local measures 222 includes determining a result from one or more of the received parameters of the client request 220 without invoking or accessing one or more of the databases 116-124. In this regard, the measure evaluation module 216 may be configured with one or more measure evaluation rules or one or more Boolean statements that, when given one or more of the local measures as a parameter, provides or yields a predetermined value. The predetermined value may be further tied to the layout selected by the layout selection module 218 from the layout database 122. As discussed below with regard to the layout selection module 218, the selection of a layout from the layout database 122 may correspond to the evaluation of one or more of the local measures 222 and/or one or more of the remote measures 224 having predetermined values. For example, one measure evaluation rule may yield a function type property value for selecting a corresponding layout and another measure evaluation rule may yield the browser type property value for selecting the corresponding layout.

For example, a first measure evaluation rule may specify that when the path parameter is "/nhome/", the function type property value for selecting the corresponding layout is "homepage," and a second measure evaluation rule may specify that when the user-agent parameter includes "Windows NT 6.3; WOW64; rv:44.0" that the browser type property value is "desktop." In this manner, the measure evaluation module 216 may be configured with a plurality of measure evaluation rules and/or Boolean statements that yield corresponding layout property values for selecting one or more layout configuration files from the layout database 122.

In addition to evaluating one or more of the local measure(s) 222, the measure evaluation module 216 is further configured to process one or more remote measure(s) 224. In this regard, processing the one or more remote measure(s) 224 may include querying one or more of the databases 116-124 to obtain additional information given the remote measure 224. In one embodiment, the measure evaluation module 216 is configured with a lookup table that indicates the queries that are to be made to the one or more databases 116-124 when provided with a selected remote measure 224 as input. For example, the member identifier parameter may be configured as a remote measure 224 which, when the member profile database 120 is queried with the member profile identifier, yields a member type property value for selecting a corresponding layout configuration file. In this example, the measure evaluation 216 may query the member profile database 120 with the provided member identifier parameter to obtain a member profile type associated with the member identifier parameter. As briefly alluded to above with regard to FIG. 1, one of the properties associated with a layout configuration file may be a member type property, which indicates the type of member that is to receive the associated layout configuration file. Thus, different types of members are associated with different types of layout configuration files. When the measure evaluation module 216 receives a response to the query associated with the member identifier parameter, the measure evaluation 216 may then communicate such response to the layout selection module 218.

As discussed above, one of the technical benefits disclosed herein is that the social networking server 112 can perform multiple tasks while awaiting evaluation of the remote measure(s) 224. In this regard, the layout selection module 218 may execute in parallel or while the measure evaluation module 216 is awaiting evaluation of the remote measure(s) 224. In one embodiment, the layout selection module 218 is configured to retrieve one or more layout configuration files according to the results obtained from the one or more local measure(s) 222 and/or the remote measure(s) 224. The layout selection module 218 and retrieve the one or more layout configuration files according to the layout selection logic 226. In particular, the layout selection logic 226 may define the layout configuration files that result from the combination of the evaluated local measures 222 and/or the evaluated remote measures 224.

In this embodiment, the layout selection module 218 is configured to retrieve multiple layout configuration files from the layout selection database 122, which are then stored as the retrieved layout(s) 228. In particular, the layout selection logic 226 may be arranged such that the layout configuration files are retrieved in a two-step process: a first process that retrieves one or more layout configuration files in response to the evaluation of one or more of the local measures 222 and a second process that selects a specific layout configuration file from the retrieved one or more layout configuration files in response to the evaluation of one or more the remote measure(s) 224. Thus, the layout selection logic 226 represents a two-tiered approach to the identification of a specific layout configuration file in response to the parameters extracted from the client request 220.

The technical benefit to the foregoing approach is that the social networking server 112 can make multiple calls to the layout configuration database 122 to retrieve layout configuration files while the social networking server 112 is waiting for one or more of the remote measures 224 to be evaluated. This is a technical benefit because it reduces the amount of latency the user 128 experiences while he or she is waiting for the requested webpage to render vis-à-vis the corresponding layout configuration file. Should there be any outstanding requests to the layout database 122 after all of the various local and/or remote measures 222, 224 are evaluated, the social networking server 112 may simply ignore any responses received in reply to these outstanding request. This circumstance may arise where the social networking server 112 queries the layout database 122 while awaiting one or more remote measures 224 to be evaluated, but the evaluation of the remote measures 224 occurs prior to the layout database 122 being able to respond to all the outstanding queries.

The social networking server 112 may also employ one or more safeguards in the event that one or more of the remote measures 224 cannot be evaluated within a specified timeframe. In one embodiment, such safeguard includes specifying a default value as a layout property value should the evaluation of a given remote measure 224 exceed the specified timeframe. For example, where the remote measure 224 being evaluated is a member type (e.g., specified by the member identifier parameter) and the specified timeframe is met or exceeded (e.g., one millisecond, one second, five seconds, etc.), the measure evaluation module 216 may assign a member type value of "standard member" to the member type.

Once a set of local measures 222 and remote measures 224 have been evaluated by the measure evaluation module 216, the layout selection module 218 can then select a selected layout 230 from the retrieved layout(s) 228. In one embodiment, each of the layout configuration files stored in the layout configuration database 122 are associated with a unique set of properties such that a given combination of the local measures 222 and the remote measures 224 is associated with the unique layout configuration file. With each layout configuration file being associated with a unique set of layout properties, the layout selection module 218 can be certain that the layout configuration file being selected from the retrieved layouts 228 is the correct layout given the local measures 222 and the remote measures 224 extracted from the client request 220.

The selected layout configuration file 230 is then communicated to the client device 104. Furthermore, when the social networking server 112 determines the selected layout configuration file 230 to communicate, the social networking server 112 retrieves one of the more of the modules to display within the requested webpage and store such modules as retrieved modules 232. In effect, the social networking server 112 is caching the modules 232 in anticipation of communicating the modules 232 to the client device 104. Thus, when a layout configuration file is communicated to the client device 104, the social networking server 112 can prefetch one or more of the modules identified by the layout configuration file to further reduce the potential latency experienced by the client device 104 in rendering the requested webpage.

After the selected layout configuration 230 is determined, the retrieved module(s) 232 are then communicated to the client device 104. However, as the social networking server 112 is configured to communicate asynchronously with the client device 104, the social networking server 112 may communicate a streamed response to the client device 104 where the streamed response may include any one of the selected layout configuration 230 or the retrieved module(s) 232. In this manner, the various components (e.g., the selected layout configuration file, one or more of the retrieved module(s) 232, any text and/or audiovisual content, etc.) of the requested webpage are communicated to the client device 104 as they are made available. This feature has the technical benefit of reducing the amount of loading time that the user 128 may experience in displaying the requested webpage.

Additionally or alternatively, the selected layout configuration file 230 identifies the modules to retrieve from the module database 124. In this manner, the client device 104 communicates request for modules from the social networking server 112 and/or the database servers 126, which are then communicated to the client device 104 and rendered accordingly (e.g., by the web client 106 or other client 108-110). While the foregoing discussion explains the technical benefits of asynchronous communications and loading of the requested webpage, the disclosed features may also be implemented through sequential communications and/or loading of the requested webpage.

Figure 3:
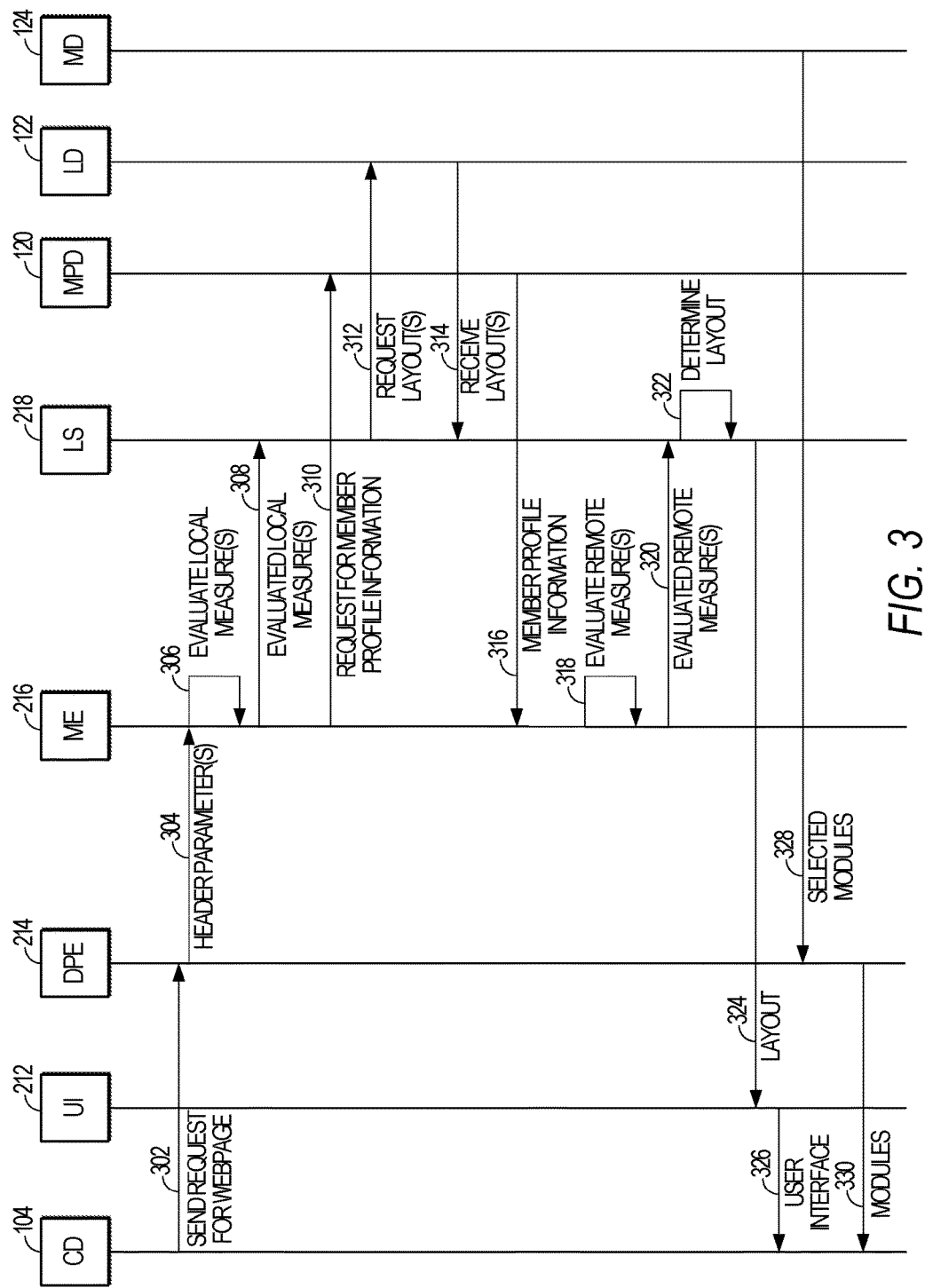
FIG. 3 illustrates a communication diagram of the communications occurring among the components of the social networking server of FIG. 1, according to an example embodiment.

FIG. 3 illustrates a communication diagram of the communications occurring among the components of the social networking server 112 of FIG. 1, according to an example embodiment. Initially, the client device 104 sends a request (e.g., the client request 120) to the social networking server 112 for a webpage, where the client request 120 is processed by the data processing engine 214 (Message 302). The data processing engine 214 then extracts various header parameters from the client request 120, which are then stored as either the local measure(s) 222 or the remote measure(s) 224. These parameters are then communicated to the measure evaluation module 216 for evaluation and/or processing (Message 304). As discussed above, and in one embodiment, the measure evaluation module 216 then evaluates one or more of the local measure(s) 222 according to one or more measure evaluation rules and/or Boolean statements to corresponding layout property values (Message 306). The evaluated local measures (e.g., the determined layout property values) are then communicated to the layout selection module 218 (Message 308).

As discussed above, the social networking server 112 is configured to perform multiple operations in parallel so as to reduce any perceived latency by the user 218. In the example shown in FIG. 3, the layout selection module 218 can request one or more layouts (e.g., one or more layout configuration files) from the layout database 122 given the obtained and layout property values from the measure evaluation module 216. The request for the layouts and the receipt of such layouts are illustrated as Messages 312-314. During such operations the measure evaluation module 216 is configured to process the one or more remote measures 224 received from the data processing engine 214. In one embodiment, the measure evaluation module 216 processes the one or more remote measures 224 by initially requesting a corresponding member profile information from the member profile database 120 (Message 310). For example, where one of the remote measures 224 is a member identifier, the measure evaluation module 216 requests member profile information corresponding to the member identifier.

Upon receipt of the member profile information (Message 316), measure evaluation module 216 may evaluate the one or more remote measures 224 (Message 318). In one embodiment, evaluating the one or more remote measures 224 includes determining one or more layout property values based on the obtained member profile information. For example, where the obtained member profile information identifies the member corresponding to the member identifier as a company administrator, the determine property value may be "administrator" or "company administrator". In this example, the determining of the layout property value is merely an illustrative and other such layout property values may be determined from the obtained member profile information. The focus of this example is to illustrate that a remote measure is a measure that is evaluated by referencing an external system or architecture, such as the member profile database 120.

Having evaluated the remote measures 224, the measure evaluation module 216 then communicates the evaluated remote measures (e.g., the determined one or more layout property values) to the layout selection module 218 (Message 320). As discussed above, the layout selection module 218 may have retrieved various layout configuration files and stored such files as the retrieved layouts 228. The layout selection module 218 then identifies the layout configuration file from the retrieved layouts 228 having the layout property value corresponding to the layout property value determined from the remote measures 224 (Message 322). The layout selection module then communicates the selected layout 230 to the user interface module 212, which then presents a user interface to the client device 104 based on the selected layout 230 (Message 326). Thereafter, one or more modules (e.g., web components) are then communicated to the client device 104 from the module database 124 (Messages 328-330). In one embodiment, the web components communicated to the client device 104 correspond to the defined portions within selected layout configuration file 230. For example, and as discussed with reference to FIG. 1, the layout configuration file may define which web components are to be retrieved and rendered by the client device 104. Furthermore, as the selected modules are streamed asynchronously to the client device 104, the user 128 experiences a faster browsing experience.

Figure 4A:
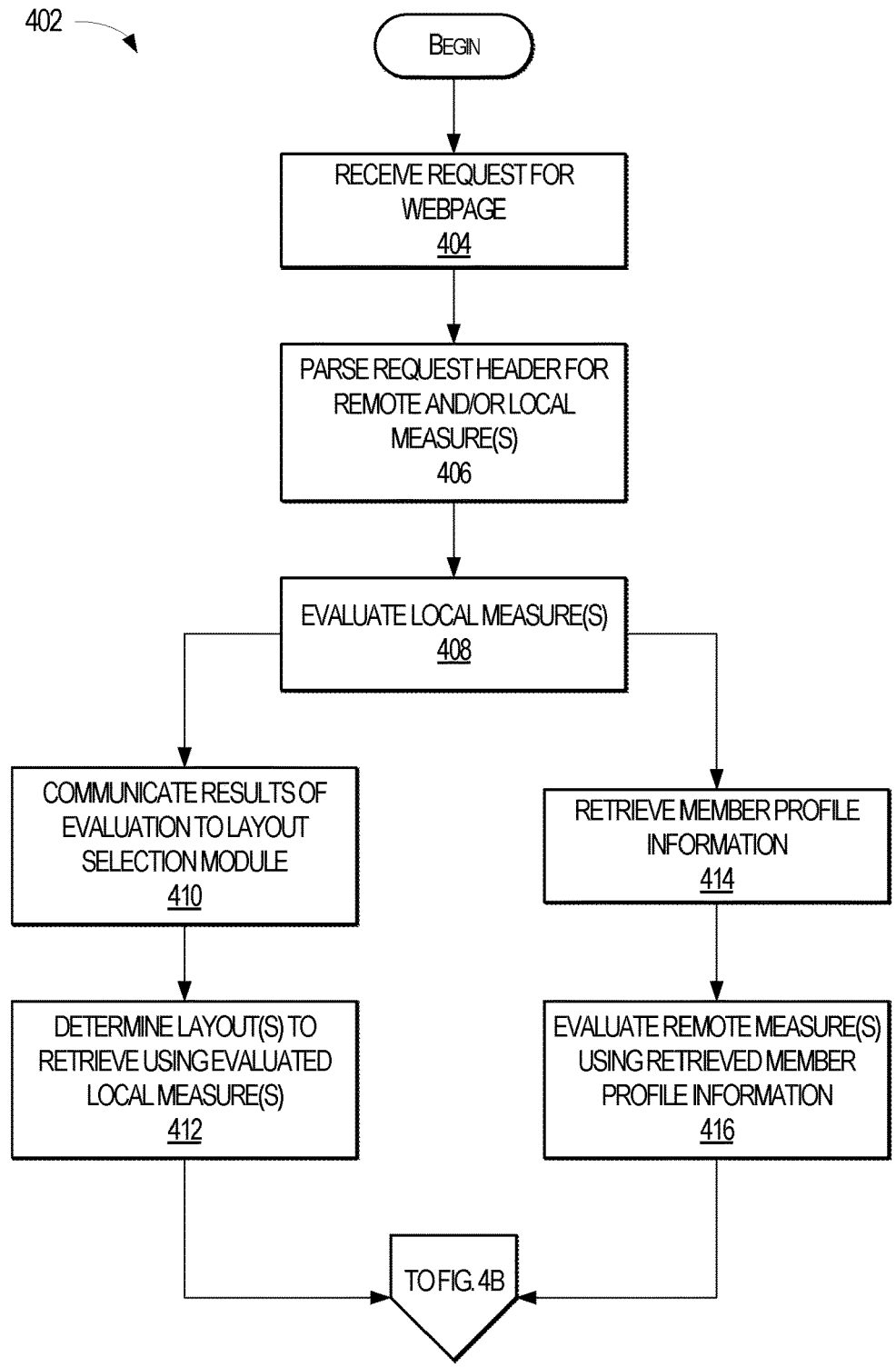
FIGS. 4A-4B illustrate a method, in accordance with an example embodiment, for retrieving and selecting a layout configuration file for communicating to the client device of FIG. 1.
Figure 4B:
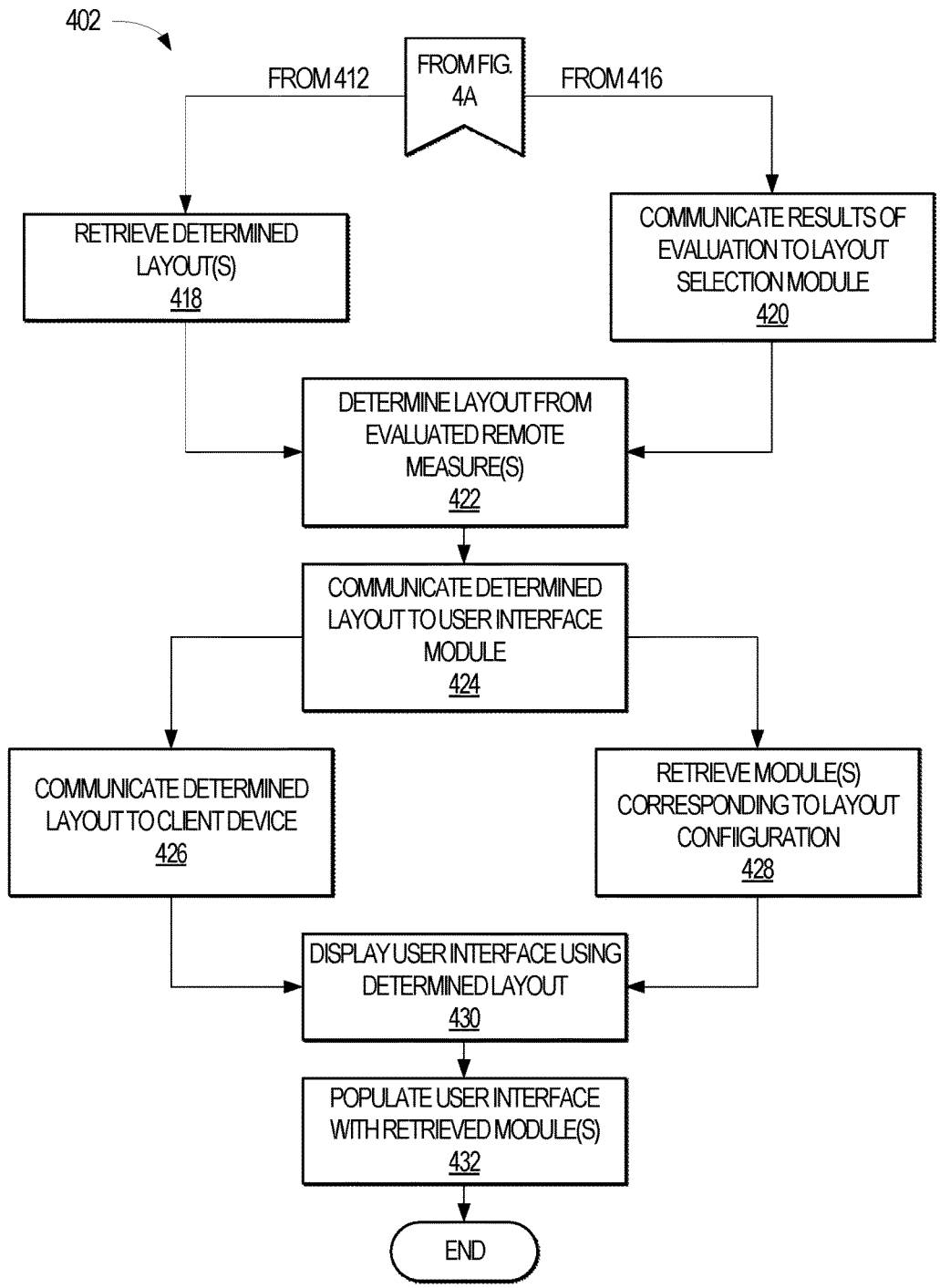

FIGS. 4A-4B illustrate a method 402, in accordance with an example embodiment, for retrieving and selecting a layout configuration file for communicating to the client device 104 of FIG. 1. The method 402 may be implemented by one or more of the modules and/or components of the social networking server 112 and discussed by way of reference thereto.

Initially, the social networking server 112 receives a request for a webpage from the client device 104 (Operation 404). The social networking server 112, via the data processing engine 214, then parses the header parameters of the client request 122 to obtain one or more local measures 222 and/or one or more remote measures 224 (Operation 406). The measure evaluation module 216 then evaluates the one or more local measures 222 to obtain corresponding layout property values (Operation 408). The measure evaluation module 216 then communicates the results of its evaluation to the layout selection module 218 (Operation 410). The layout selection module 218, in turn, queries the layout database 122 with the layout property values (e.g., the results of the evaluated local measures 222) to retrieve one or more corresponding layout configuration files (Operation 412).

In parallel, the measure evaluation module 216 also processes the remote measures 224. As discussed above, in one embodiment, processing the remote measures 224 includes retrieving corresponding profile information from the member profile database 120 (Operation 414). The measure evaluation module 216 then evaluates the remote measures 224 using the retrieved member profile information (Operation 416). In an alternative embodiment, the measure evaluation module 216 communicates remote measures 224 to another system or architecture (e.g., one or more database servers 126) to obtain layout property values corresponding to the evaluated remote measures 224.

Referring next to FIG. 4B, the layout selection module 218 retrieves the layout configuration files corresponding to the evaluated local measures 222 (Operation 418). As discussed above with reference to FIG. 2, the retrieved layout configuration files are stored as the retrieved layouts 228. In addition, the measure evaluation module 216 communicates the results of the evaluated remote measures 224 to the layout selection module 218 (Operation 420). The layout selection module 218 then selects a layout configuration file from the retrieved layouts 228 using the evaluated remote measures 224 (Operation 422). As explained previously, the layout selection module 218 may identify which of the retrieved layouts 228 has one or more property values matching the evaluated remote measures 224. In one embodiment, each of the layout configuration files are associated with a unique set of layout property values such that each combination of the evaluated local and remote measures 222, 224 yields one corresponding layout configuration file. In this manner, the layout selection module 218 can obtain a selected layout 230.

Once a layout configuration file is determined, the layout selection module 218 instructs the user interface module 212 to communicate the selected layout 230 to the client device 104 (Operation 426). The client device 104 then displays a user interface corresponding to the selected layout 230 (Operation 430). As the client 104 and the social networking server 112 are also in asynchronous communication, the social networking server 112 can also retrieve one or more modules (e.g., web components) identified by the layout configuration file while the client device 104 is displaying and/or rendering the layout configuration (Operation 428). As a client device 104 is displaying a user interface corresponding to the layout configuration file, client device 104 also retrieves and displays web components identified by the layout configuration file (Operation 432). As the client device 104 communicates asynchronously with the social networking server 112, the client device 104 displays the web components as they are received from the social networking server 112. This is in contrast to synchronous or sequential communication, which instructs the client device 104 to render the user interface for interacting with the social networking server 112 after receiving all of the data required to display such interface from the social networking server 112.

In this manner, this disclosure provides systems and methods for obtaining, selecting, and communicating layout configurations for one or more web pages corresponding to the header parameter values received as part of an initial HTTP request for such web pages. One of the technical approaches to this disclosure is that the layout configuration files specify the manner in which web components (e.g., modules for interacting with the social networking service) are to be displayed via a client device 104. As the layout configuration files are tailored according to defined layout property values, a web developer can assign a web page to a layout configuration file knowing that members who visit such web page will have a uniform experience. Furthermore, as the identification and retrieval of the layout configuration files is performed asynchronously using intelligent prediction methods (e.g., the two-tiered process described above), the layout configuration files can be provided to the requesting client device 108 with a reduced latency than conventional methods of serving web pages. Thus, there are several technical benefits that the disclosed systems and methods provide which are unique to the field of web development and web hosting.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-4B are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Example Machine Architecture and Machine-Readable Medium

Figure 5:
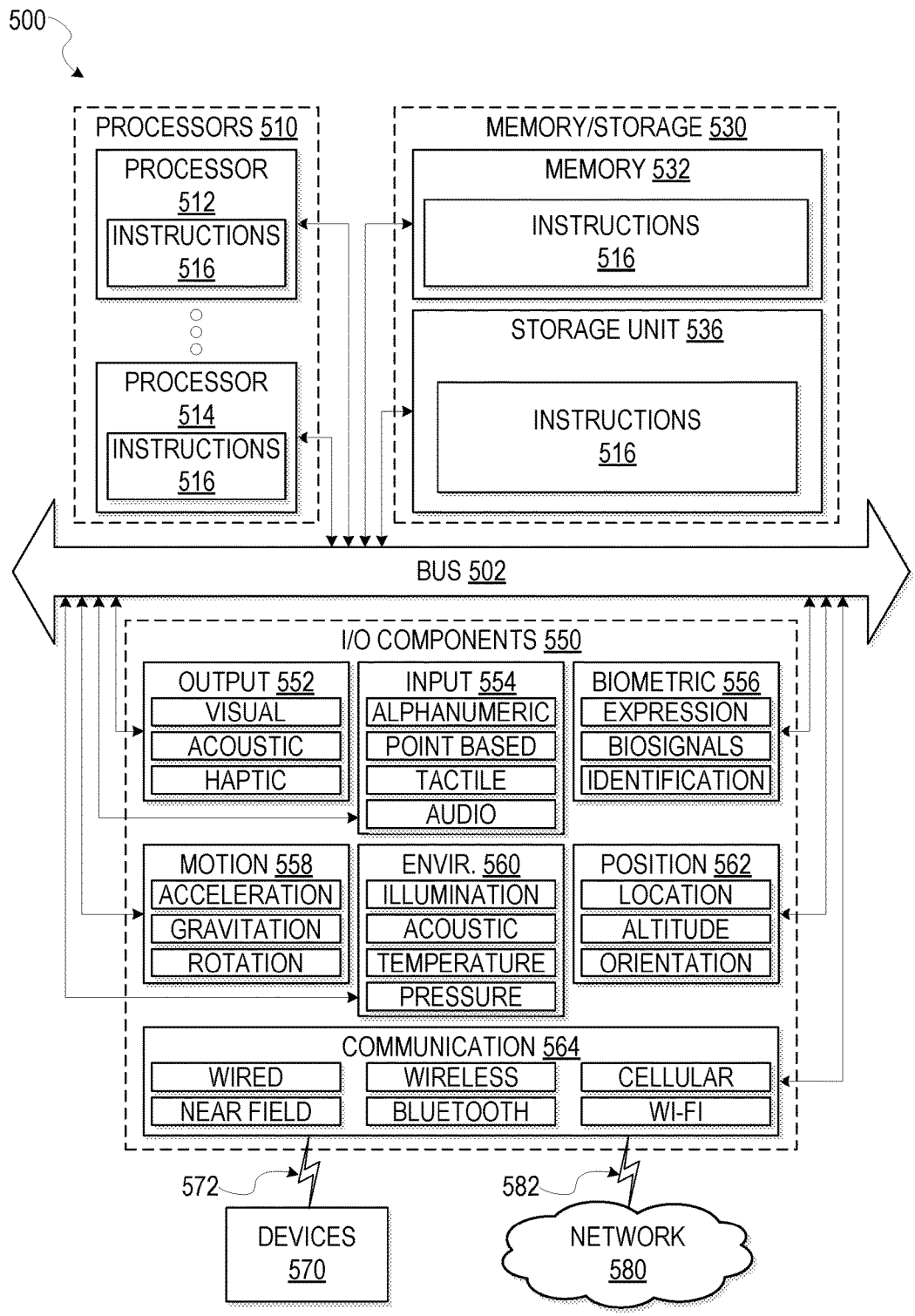
FIG. 5 is a block diagram illustrating components of a machine, according to some example embodiments, able to read instructions from a machine-readable medium (e.g., a machine-readable storage medium) and perform any one or more of the methodologies discussed herein.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute the flow diagrams of FIGS. 3-4B. Additionally, or alternatively, the instructions 516 may implement one or more of the components of FIG. 2. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a personal digital assistant (PDA), or any machine capable of executing the instructions 516, sequentially or otherwise, that specify actions to be taken by machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory/storage 530, and I/O components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 512 and processor 514 that may execute the instructions 516. The term "processor" is intended to include multi-core processor that may comprise two or more independent processors (sometimes referred to as "cores") that may execute instructions 516 contemporaneously. Although FIG. 5 shows multiple processors 510, the machine 500 may include a single processor with a single core, a single processor with multiple cores (e.g., a multi-core process), multiple processors with a single core, multiple processors with multiples cores, or any combination thereof.

The memory/storage 530 may include a memory 532, such as a main memory, or other memory storage, and a storage unit 536, both accessible to the processors 510 such as via the bus 502. The storage unit 536 and memory 532 store the instructions 516 embodying any one or more of the methodologies or functions described herein. The instructions 516 may also reside, completely or partially, within the memory 532, within the storage unit 536, within at least one of the processors 510 (e.g., within the processor's cache memory), or any suitable combination thereof, during execution thereof by the machine 500. Accordingly, the memory 532, the storage unit 536, and the memory of processors 510 are examples of machine-readable media.

As used herein, "machine-readable medium" means a device able to store instructions 516 and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine 500 (e.g., processors 510), cause the machine 500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562 among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via coupling 582 and coupling 572 respectively. For example, the communication components 564 may include a network interface component or other suitable device to interface with the network 580. In further examples, communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a Universal Serial Bus (USB)).

Moreover, the communication components 564 may detect identifiers or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF416, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 580 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network and the coupling 582 may be a Code Division Multiple Access (CDMA) connection, a Global System for Mobile communications (GSM) connection, or other type of cellular or wireless coupling. In this example, the coupling 582 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., hypertext transfer protocol (HTTP)). Similarly, the instructions 516 may be transmitted or received using a transmission medium via the coupling 572 (e.g., a peer-to-peer coupling) to devices 570. The term "transmission medium" shall be taken to include any intangible medium that is capable of storing, encoding, or carrying instructions 516 for execution by the machine 500, and includes digital or analog communications signals or other intangible medium to facilitate communication of such software. Language Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
    a machine-readable medium storing computer-executable instructions; and
    at least one hardware processor communicatively coupled to the machine-readable medium that, when the computer-executable instructions are executed, configures the system to:
        extract one or more parameter values from a request for a webpage;
        identify the extracted one or more parameter values as one or more local measures and one or more remote measures;
        evaluate the one or more local measures to obtain a first set of one or more corresponding layout property values, at least one of the first set of one or more layout property values specifying a characteristic of a layout for the requested webpage;
        request one or more layout configurations according to the first set of one or more layout property values;
        while the one or more layout configurations are being requested, evaluate one or more remote measures to obtain a second set of one or more corresponding layout property values;
        identify a layout configuration selected from the one or more requested layout configurations according to the second set of one or more corresponding layout property values;
        communicate the identified layout configuration to a client device for displaying the requested webpage according to the identified layout configuration.

2. The system of claim 1, wherein the system is further configured to:
    retrieve a plurality of modules for displaying the requested webpage, at least one of the modules being displayable within a portion of the requested webpage defined by the identified layout configuration; and
    communicate the retrieved plurality of modules to the client device.

3. The system of claim 2, wherein the identified layout configuration and the retrieved plurality of modules are communicated asynchronously to the client device.

4. The system of claim 1, wherein a local measure comprises a parameter value that is locally evaluated by the at least one hardware processor without communicating the local measure using a network communication protocol.

5. The system of claim 1, wherein a remote measure comprises a parameter value that is communicated to a non-local system using a network communication protocol for evaluation.

6. The system of claim 1, wherein the one or more parameter values are obtained from one or more Hypertext Transfer Protocol header fields of the request for the webpage.

7. The system of claim 1, wherein the requested one or more layout configurations are each associated with a third set of layout property values, each set of layout property values for each of the sets of the third set of layout property values being unique.

8. A method comprising:
    extracting, by at least one hardware processor, one or more parameter values from a request for a webpage;
    identifying, by at least one hardware processor, the extracted one or more parameter values as one or more local measures and one or more remote measures;
    evaluating, by at least one hardware processor, the one or more local measures to obtain a first set of one or more corresponding layout property values, at least one of the first set of one or more layout property values specifying a characteristic of a layout for the requested webpage;

requesting, by at least one hardware processor, one or more layout configurations according to the first set of one or more layout property values;

while the one or more layout configurations are being requested, evaluating, by at least one hardware processor, one or more remote measures to obtain a second set of one or more corresponding layout property values;

identifying, by at least one hardware processor, a layout configuration selected from the one or more requested layout configurations according to the second set of one or more corresponding layout property values;

communicating, by at least one hardware processor, the identified layout configuration to a client device for displaying the requested webpage according to the identified layout configuration.

9. The method of claim 8, further comprising:

retrieving a plurality of modules for displaying the requested webpage, at least one of the modules being displayable within a portion of the requested webpage defined by the identified layout configuration; and communicating the retrieved plurality of modules to the client device.

10. The method of claim 9, wherein the identified layout configuration and the retrieved plurality of modules are communicated asynchronously to the client device.

11. The method of claim 8, wherein a local measure comprises a parameter value that is locally evaluated without communicating the local measure using a network communication protocol.

12. The method of claim 8, wherein a remote measure comprises a parameter value that is communicated to a non-local system using a network communication protocol for evaluation.

13. The method of claim 8, wherein the one or more parameter values are obtained from one or more Hypertext Transfer Protocol header fields of the request for the webpage.

14. The method of claim 8, wherein the requested one or more layout configurations are each associated with a third set of layout property values, each set of layout property values for each of the sets of the third set of layout property values being unique.

15. A non-transitory, machine-readable medium storing computer-executable instructions that, when executed by at least one hardware processor communicatively coupled to the machine-readable medium, configures a system to perform a plurality of operations, the operations comprising:

extracting one or more parameter values from a request for a webpage;

identifying the extracted one or more parameter values as one or more local measures and one or more remote measures;

evaluating the one or more local measures to obtain a first set of one or more corresponding layout property values, at least one of the first set of one or more layout property values specifying a characteristic of a layout for the requested webpage;

requesting one or more layout configurations according to the first set of one or more layout property values;

while the one or more layout configurations are being requested, evaluating one or more remote measures to obtain a second set of one or more corresponding layout property values;

identifying a layout configuration selected from the one or more requested layout configurations according to the second set of one or more corresponding layout property values;

communicating the identified layout configuration to a client device for displaying the requested webpage according to the identified layout configuration.

16. The non-transitory, machine-readable medium of claim 15, wherein the plurality of operations further comprise:

retrieving a plurality of modules for displaying the requested webpage, at least one of the modules being displayable within a portion of the requested webpage defined by the identified layout configuration; and communicating the retrieved plurality of modules to the client device.

17. The non-transitory, machine-readable medium of claim 16, wherein the identified layout configuration and the retrieved plurality of modules are communicated asynchronously to the client device.

18. The non-transitory, machine-readable medium of claim 15, wherein a local measure comprises a parameter value that is locally evaluated by the at least one hardware processor without communicating the local measure using a network communication protocol.

19. The non-transitory, machine-readable medium of claim 15, wherein a remote measure comprises a parameter value that is communicated to a non-local system using a network communication protocol for evaluation.

20. The non-transitory, machine-readable medium of claim 15, wherein the requested one or more layout configurations are each associated with a third set of layout property values, each set of layout property values for each of the sets of the third set of layout property values being unique.

* * * * *

UNITED STATES PATENT AND TRADEMARK OFFICE
CERTIFICATE OF CORRECTION

PATENT NO. : 10,165,038 B2  
APPLICATION NO. : 15/086533  
DATED : December 25, 2018  
INVENTOR(S) : James Margatan Page 1 of 1

It is certified that error appears in the above-identified patent and that said Letters Patent is hereby corrected as shown below:

On the Title Page

In item (54), in "Title", in Column 1, Line 1, after "FOR", delete "A"

In the Specification

In Column 1, Line 1, after "FOR", delete "A"

In the Claims

In Column 24, Line 57, in Claim 8, delete "processor;" and insert --processor,-- therefor Signed and Sealed this  
Tenth Day of March, 2020

Andrei Iancu  
*Director of the United States Patent and Trademark Office*